United States Patent [19]

Sato

[11] 4,098,620

[45] Jul. 4, 1978

[54] COMPOSITE COATING OF ENHANCED RESISTANCE TO ATTACK

[75] Inventor: Tatsuo Sato, Painesville, Ohio

[73] Assignee: Diamond Shamrock Corporation, Cleveland, Ohio

[21] Appl. No.: 807,785

[22] Filed: Jun. 20, 1977

[51] Int. Cl.$^2$ .................. B05D 1/38; B05D 3/02; B05D 7/14; B32B 15/08

[52] U.S. Cl. .................. 148/6.2; 148/31.5; 427/380

[58] Field of Search ............ 148/6.2, 31.5; 427/380

[56] References Cited

U.S. PATENT DOCUMENTS

| | | | |
|---|---|---|---|
| 3,382,081 | 5/1968 | Cutter et al. | 148/6.2 X |
| 3,437,531 | 4/1969 | Svadlenak | 148/6.2 |
| 3,519,501 | 7/1970 | Holden et al. | 148/6.2 |
| 3,535,166 | 10/1970 | Hamilton | 148/6.2 |
| 3,535,167 | 10/1970 | de Ridder et al. | 148/6.2 |
| 3,671,331 | 6/1972 | Malkin et al. | 148/6.2 |
| 3,679,493 | 7/1972 | Beiswanger et al. | 148/6.2 X |
| 3,687,739 | 8/1972 | Kennedy et al. | 148/6.2 |
| 4,020,220 | 4/1977 | Germano | 427/380 X |

Primary Examiner—James R. Hoffman
Attorney, Agent, or Firm—John J. Freer

[57] ABSTRACT

Composite coatings, established on metal substrates, now exhibit enhanced film integrity, such as when exposed to chemicals, solvents and salt. Additional desirable coating characteristics are also maintained. The undercoating of the composite contains a hexavalent-chromium-providing substance. Included in the topcoating applied over the uncured undercoating is a hydroxyl-containing resin and isocyanate adduct. Subsequent heating fully develops the undercoat curing while concomitantly curing the topcoating.

6 Claims, No Drawings

COMPOSITE COATING OF ENHANCED RESISTANCE TO ATTACK

BACKGROUND OF THE INVENTION

Coating compositions for metal substrates that are applied prior to painting, and that contain a hexavalent-chromium-providing substance, may further contain a finely divided metal. For example, in U.S. Pat. No. 3,671,331 there are disclosed pulverulent metal containing chromium bonding compositions that contain, in addition to the chromium substance, a reducing agent for such substance and a particulate metal such as pulverulent zinc. Also U.S. Pat. No. 3,687,739 discloses the preparation of a treated metal surface wherein such treatment includes application of a composition containing, among other constituents but as critical ingredients, chromic acid and a particulate metal.

In composite coating techniques, it has been known to dry an undercoating, which needs curing, and then apply a topcoating. A single curing step then follows to cure both the undercoating and the topcoating as has been disclosed, for example, in British Pat. No. 845,259. As has been taught in U.S. Pat. No. 4,020,220, applied coatings from compositions that contain a hexavalent-chromium-providing substance which is susceptible to valency reduction to a lower valence state during curing, may also be topcoated and then subsequently be fully cured.

After the precoat application, then the topcoat application, and the final curing, the resulting coated article must usually exhibit a wide variety of desirable characteristics. Exemplary of these are coating adhesion during metal forming operations, plus retention of weldability where the coated substrate would otherwise be weldable. Resistance to attack, and particularly as exhibited against corrosive attack of the metal substrate, is critical. Resistance to other agents, such as acids and solvents, is also often needed.

SUMMARY OF THE INVENTION

It has now been found that a final curing operation will not only fully cure the undercoating but will also, at the same time, cure the topcoating while providing a composite coating having enhanced characteristics. This final cure operation for both the undercoating and the topcoating is referred to herein for convenience as "monobaking." By incorporating isocyanate adduct into the applied topcoating, this monobaking can be effected without variation from the procedure with coatings not containing such adduct.

For the resulting composite coating, the sought after enhancement of resistance to chemical attack, such as acid resistance, as well as resistance to solvent attack is achieved. Other, expected coating characteristics are not diminished. Rather, shear adhesion can be enhanced. Also, the storage life of the topcoat composition is unaltered. Unexpectedly, corrosion resistance for the coated metal substrate such as exhibited in salt spray testing is most desirably augmented.

In one aspect, the present invention is directed to the method of preparing a chemical and corrosion resistant coated metal substrate. The method first comprises establishing on the surface of the substrate an undercoating containing from about 50 to about 5,000 milligrams per square foot of coated substrate of pulverulent metal in intimate mixture with a substantially resin-free hexavalent-chromium-containing coating composition. Such composition contains a hexavalent-chromium-providing substance and reducing agent therefor in liquid medium. The composition is present in an amount sufficient to provide the coating with from about 5 to about 500 milligrams per square foot of coated substrate of chromium.

The method of the invention next comprises drying the resulting undercoated substrate at a temperature and for a period of time sufficient to vaporize volatile substituents from the coating composition, but insufficient to provide a water-resistant undercoating having substantial orientation of the hexavalent chromium towards reduction. The method next comprises applying on the dry undercoating a topcoat composition comprising hydroxyl-containing resin, particulate, electrically conductive pigment and less than about 5%, basis total topcoat composition weight, of isocyanate adduct capable of unblocking at a temperature above about 350° F.

The method of this aspect of the invention lastly comprises heating the resulting coated article to a temperature above 350° F and for a period of time sufficient to: (a) orient at least a portion of the undercoating hexavalent chromium toward reduction; commensurate with (b) unblocking the isocyanate adduct and providing cross-linking reaction of resulting isocyanate with topcoat resin.

In another aspect, the invention comprises a composite coated metal substrate including an improved topcoat composition.

DESCRIPTION OF THE PREFERRED EMBODIMENTS

The pre-paint coatings, which may also be termed herein as an "undercoating" or "base coating", can contain a particulate metal such as aluminum, manganese, zinc and magnesium. These particulate metals have been disclosed as useful in bonding coating compositions, containing a hexavalent-chromium-providing substance and reducing agent therefor, in U.S. Pat. No. 3,671,331.

Of particular interest for the present invention are such bonding coatings. Those that are preferred may contain succinic acid and other dicarboxylic acids of up to 14 carbon atoms as the reducing agents, as has been disclosed in U.S. Pat. No. 3,382,081. Such acids with the exception of succinic may be used alone, or these acids can be used in mixture or in mixture with other organic substances exemplified by aspartic acid, acrylamide or succinimide. Additionally useful combinations that are particularly contemplated are combinations of mono-, tri- or polycarboxylic acids in combination with additional organic substances as has been taught in U.S. Pat. No. 3,519,501. Also of particular interest are the teachings in regard to reducing agents, that may be acidic in nature, and have been disclosed in U.S. Pat. Nos. 3,535,166 and 3,535,167. Of further particular interest are glycols and glycol-ethers and many representative compounds have been shown in U.S. Pat. No. 3,679,493.

Substantially all of the pre-paint undercoatings compositions are simply water based, ostensibly for economy. But for additional or alternative substances, to supply the liquid medium at least for some of these compositions, there have been taught, as in U.S. Pat. No. 3,437,531, blends of chlorinated hydrocarbons and a tertiary alcohol including tertiary butyl alcohol as well as alcohols other than tertiary butyl alcohol. It would appear then in the selection of the liquid medium that economy is of major importance and thus such medium would most always contain readily commercially available liquids. Chromium is typically present in the hexavalent state by incorporation into the undercoating compositions as chromic acid or dichromate salts or the like. During the curing of the applied coatings composition, the metal is susceptible to valency reduction to a lower valence state. Such reduction is generally enhanced by the presence of the reducing agent in the composition.

When the undercoating is established, typically by application directly to the surface of the substrate to be coated, although such substrate might be a precoated metal substrate, such as for example, a phosphatized metal substrate, the applied coating will be non-water resistant. That is, such applied coating, prior to curing, can be easily removed by rubbing with a damp cloth.

Although it will reach the condition of a dry coating by any conventional drying means, the drying is typically forced drying at elevated temperature. In general, the drying conditions are temperatures below 550° F air temperature, and at such temperature, for times of less than about 2 minutes. However, lower temperatures such as 450°–500° F, with drying times, such as 0.5–1.5 minutes are more typically used. The resulting undercoated article may then be cooled before topcoating.

The resulting weight of the undercoating on the metal substrate may vary to a considerable degree, but will most typically always be present in an amount supplying between about 5–500 milligrams per square foot of chromium, expressed as chromium and not $CrO_3$. Also, the coated metal substrate should contain between about 50 and about 5,000 milligrams per square foot of pulverulent metal and preferably have a weight ratio of chromium to pulverulent metal of not substantially above about 0.3:1.

The undercoating is topcoated with a weldable primer containing an electrically conductive pigment in a vehicle. More particularly, the welding primers are coating compositions containing a particulate, electrically conductive pigment of aluminum, copper, cadmium, steel, carbon, zinc, or magnetite, i.e., the magnetic oxide of iron, and including mixtures thereof such as of aluminum flake and zinc powder. Generally, the carbon pigments, e.g., channel blacks or furnace blacks, are the most finely divided of these electrically conductive pigments, often having particle size of 0.01 micron for the intensely black pigments. Comparatively, the finely divided aluminum powders have flake thicknesses for the finest grades of about 0.25 micron. These aluminum pigments can be typically produced by stamping, generally of small pieces of aluminum foil, or by ball milling atomized aluminum formed by air blasting a molten aluminum spray. Typically a finely divided zinc pigment is a distilled zinc dust or particles prepared by atomizing molten zinc in an air stream. Particle size for distilled zinc powders often average from about 2 to about 6 microns with generally about 99 weight percent or better passing a 240 mesh U.S. Standard Sieve.

Since these primers generally are applied preparatory to subsequent welding of the substrate, they must contain a substantial amount of the electrically conductive pigment, e.g., at least about 30 volume percent pigment for the zinc-rich primers and often more than about 65 percent by volume of particulate pigment, but on a weight basis, because of the density of the zinc, these primers can contain up to about 98 weight percent of such pigment.

In fomulating the weldable primers, the binder component can be made up of resins at least one of which will be hydroxyl-containing. Thus the binder components for the zinc-rich primer can be polyamide resins combined with epoxy resins, although other binder materials have been found to be compatible with particulate zinc pigment, e.g., acrylic resin, nitrocellulose resin, and epoxy esters including epoxy ester medium oil content linseed oil. It is preferred that the binder component contain some epoxy resin.

As a critical constituent the topcoat composition will also contain up to about 5%, basis total topcoat composition weight, of isocyanate adduct. Greater than about 5 weight percent of such adduct is regarded as uneconomical as such greater amount will not provide any commensurate additional benefit. It is possible that as little as 0.01 weight percent of the isocyanate adduct may be present but it is preferable, for efficiency and economy, that the coating composition contain above about 0.2 weight percent of the adduct. The adduct should "unblock," i.e., provide reactive isocyanate, at a temperature below 350° F. It is typical though for the adduct to provide free isocyanate at a temperature of about 150° C, as has been discussed, for example, in U.S. Pat. No. 2,995,531. This allows the blocked isocyanate to be blended in the topcoat composition for subsequent storage, before use.

It is contemplated to use any blocked isocyanate, and for a variety of such, reference can be made to U.S. Pat. No. 3,723,372. It is preferred, however, for economy to use a readily commercially available blocked isocyanate and such include those formed from toluene 2,4-disocyanate, or apparent derivatives thereof, which are "blocked" with phenol.

Additionally the topcoating formulations can contain flow control agents, as for example urea formaldehyde resins, thixotroping agents such as silica and organic derivatives of magnesium montmorillonite, and antisettling agents particularly for the aluminum and zinc primers which agents include hydrogenated castor oil and aluminum stearate. Also for the aluminum and zinc primers where gassing can be a problem a gas inhibiting substance such as lime or calcium oxide is generally included in the formulation. Also, these primers usually contain, and/or are typically cut back after formulation but before application with, petroleum derived hydrocarbon liquids such as toluene, benzene, xylene, and synthetically prepared aromatic solvent blends from petroleum. Zinc-rich weldable primers have been more extensively reviewed in an article entitled "Zinc-Rich Paints" in Paint and Varnish Production, April, 1964, p. 35 f.: May, 1964 p. 87 f.; and June 1964, p. 47 f.

The final make up of the primer can be dependent upon the method of application of the primer to the treated metal substrate. Typically for primers containing zinc dust or combinations of zinc dust with aluminum flake, or zinc flake with aluminum flake and the like, where such primers are spray applied to the metal substrate they may contain between about 50–80 weight percent of the pulverulent metal and between about 10–30 weight percent of binder. Also such primers generally are formulated with a few weight percent or less of a thixotroping agent, and often with a half weight percent or less of a metallic drier, e.g., a lead, manganese, cobalt or other metallic salt of organic acid, and typically 10–30 weight percent of petroleum derived hydrocarbon liquid.

The heating, i.e., the monobaking, of the coating composite can be merely baking in a simple convection oven, as opposed to infrared baking. This heating will be at an air temperature above about 350° F and at such temperature will usually continue for a time of about 0.5 minute and usually a time no longer than about 10 minutes. On the other hand, air temperatures above about 1,000° F can be inefficient and lead to film degradation during heating. Typically, the air temperature will be maintained within the range of between about 400°–700° F with cure times ranging from as quickly at about 2 to 3 minutes up to as long as 10 to 20 minutes.

Before application of the pre-paint coating composition to a metal substrate, it is generally advisable to remove foreign matter from the metal surface by thoroughly cleaning and degreasing. Degreasing can be accomplished with known agents such as sodium metasilicate, caustic soda, carbon tetrachloride, trichloroethylene and the like. The use of commercial alkaline cleaning compositions can be employed with combine washing and mild abrasive treatment, e.g., an aqueous trisodium phosphate-sodium hydroxide cleaning solution. In addition to cleaning, the substrate can undergo cleaning plus etching, for example, with a strong inorganic acid etching agent.

After coating by the methods of the present invention, the resulting coated substrate can be further top-coated with any suitable paint, i.e., a paint, primer, enamel, varnish, or lacquer. Such paints may contain pigment in a binder or can be unpigmented, e.g., generally cellulose lacquers, rosin varnishes, and oleoresinous varnishes, as for example tung oil varnish. The paints can be solvent reduced or they may be water reduced, e.g., latex or water-soluble resins, including modified or soluble alkyds, or the paints can have reactive solvents such as in the polyesters or polyurethanes. Additional suitable paints which can be used include oil paints, including phenolic resin paints, solvent-reduced alkyds, epoxys, acrylics, vinyl, including polyvinyl butryal and oil-wax-type coatings such as linseed oil-paraffin wax paints. The paints may be applied as mill finishes.

The following example shows a way in which the invention has been practiced but should not be constructed as limiting the invention. In the example, the following procedures have been employed.

PREPARATION OF TEST PANELS

Unless otherwise specifically described, test panels are typically 4 inches × 8 inches cold rolled, low carbon steel panels. They are prepared for coating by first scrubbing with a cleaning pad which is a porous, fibrous pad of synthetic fiber impregnated with an abrasive. Thereafter, the scrubbed panels are immersed in a cleaning solution typically containing chlorinated hydrocarbon and maintained at about 180° F, or containing 1–5 ounces, per gallon of water, of a mixture of 25 weight percent tripotassium phosphate and 75 weight percent potassium hydroxide. This alkaline bath is maintained at a temperature of about 150° – 180° F. Following the cleaning, the panels are rinsed with warm water and preferably dried.

SOLVENT RESISTANCE TEST

Painted panels are immersed for sixteen hours in organic solvent. Panels are removed from the solvent and are immediately manually rubbed across the panel about twenty strokes with a paper tissue while using moderate pressure. Rubbed panels are then visually inspected to see if the undercoating has been exposed during the rubbing, with the film being regarded as soluble if the undercoating has been exposed. Solvents used include benzene, toluene and cellulose acetate.

CORROSION RESISTANCE TEST (ASTM B-117)

Corrosion resistance of coated parts is measured by means of the standard salt spray (fog) test for paints and varnishes ASTM B-117. In this test, the parts are placed in a chamber kept at constant temperature where they are exposed to a fine spray (fog) of a 5% salt solution for specified periods of time, rinsed in water and dried. The extent of corrosion on the test parts is determined by comparing parts one with another, and all by visual inspection. The efficacy of the corrosion resistance obtained on coated panels is, in part, quantitatively evaluated on a numerical scale from 0 to 10. The panels are visually inspected and compared with one another and the system is used for convenience in the reviewing of results. In the rating system the following numbers are used to cover the following results:

(0) retention of film integrity, no red rust;
(2) initial coating degradation, pinpoints of red rust;
(4) less than 3% red rust basis total surface area of the part;
(6) 3 to 10% red rust, i.e., a significant amount of rust;
(8) 10 to 25 percent surface area red rust;
(10) greater than 25 percent red rust.

EXAMPLE

There is formulated, with blending, an undercoating composition containing 20 grams per liter of chromic acid, 3.3 grams per liter of succinic acid, 1.7 grams per liter of succinimide, 1.5 grams per liter of xanthan gum hydrophillic colloid, which is a heteropolysccharide prepared from the bacteria specie *Xanthamonas camperstris* and has a molecular weight in excess 200,000. Additionally, the composition contains 1 milliliter of formalin, 7 grams per liter of zinc oxide, 120 grams per liter of zinc dust having an average particle size of about 5 microns and having all particles finer than 16 microns, and 1 drop per liter of a wetter which is a nonionic, modified polyethoxide adduct having a viscosity in centipoises at 25° C of 180 and a density at 25° C of 8.7 lbs. per gallon. After mixing all of these constituents, this undercoating composition is then ready for coating test panels.

Panels, prepared as described hereinabove, are dip coated in the undercoating composition. They are then removed from the composition and excess composition is drained from the panels. Some panels are then baked for 1.5 minutes, and are thereby the "monobake" panels, and some for 4 minutes, which are "dibake" panels, all in an oven at an oven temperature of 500° F.

Panels are then primer topcoated. The primer used is a commercially available primer which is a zinc-rich weldable primer having a weight per gallon of about 15.2 lbs., a solids volume of about 29%, and containing about 64 weight percent solids content. The binder component is prepared from a high molecular weight epoxy resin. The primer has a typical viscosity of about 80 seconds as measured on a No. 4 Ford cup. Prior to use, there is blended, with vigorous agitation, into one batch of the primer 0.5 weight percent, basis total batch weight, of a phenol blocked polyisocyanate adduct. The adduct is a yellowish solid having a weight per gallon of 10.6 pounds, an average equivalent weight of 336 and a percentage of available NCO of 11.5–13.5. Each respective batch of primer is applied to undercoated panels by drawing the primer down over the panel with a No. 18 draw bar to provide a smooth, uniform primer coat, generally of about 0.5 mil. thickness. Resulting coated panels are cured for either 2½, or 3, or 4½ minutes in an oven at 500° F.

In the manner as described hereinabove, panels that have been subjected to the above-described corrosion resistance (salt spray) test are quantitatively evaluated for corrosion by visual inspection, comparing panels with one another and employing the above-discussed rating system. From the resulting ratings, the results for percentage changes are determined by straight-forward calculation. These results are shown in the table below. Also shown in the table below are results for panels subjected to the above-discussed solvent resistance test.

TABLE

| Undercoating Cure Time, Min. | | Solvent Resistance | | Corrosion Resistance Improvement, %: Monobake vs. Dibake | |
|---|---|---|---|---|---|
| Monobake | Dibake | No Adduct | With Adduct | No Adduct | With Adduct |
| 1.5 | 4 | Soluble | Insoluble | 330 Test Hours | |
| | | | | 100% | 120% |
| | | | | 520 Test Hours | |
| | | | | 100% | 130% |

I claim:

1. The method of preparing a chemical and corrosion resistant coated metal substrate which method comprises:
   (1) establishing on the surface of said substrate an undercoating containing from about 50 to about 5,000 milligrams per square foot of coated substrate of pulverulent metal in intimate mixture with a substantially resin-free hexavalent chromium-containing coating composition containing a hexavalent-chromium-providing substance and reducing agent therefor in liquid medium, said composition being present in an amount sufficient to provide said coating with from about 5 to about 500 milligrams per square foot of coated substrate of chromium;
   (2) drying the resulting undercoated substrate at a temperature and for a period of time sufficient to vaporize volatile substituents from said coating composition, but insufficient to provide a water-resistant undercoating having substantial orientation of the hexavalent chromium towards reduction;
   (3) applying on the dry undercoating a topcoat composition comprising hydroxyl-containing resin, particulate, electrically conductive pigment, and less than about 5%, basis total topcoat composition weight, of isocyanate adduct capable of unblocking at a temperature above about 350° F.; and
   (4) heating the resulting coated article at a temperature above 350° F. and for a period of time sufficient to: (a) orient at least a portion of the undercoating hexavalent chromium toward reduction; commensurate with, (b) unblocking the isocyanate adduct and providing cross-linking reaction of resulting isocyanate with topcoat resin.

2. The method of claim 1 wherein the drying of the undercoated substrate is forced drying providing a peak metal temperature not substantially above about 300° F. and the undercoating is cooled prior to application of the topcoat composition.

3. The method of claim 1 wherein the heating at a temperature above 350° F. provides a peak metal temperature above about 400° F.

4. The method of claim 1 wherein the topcoat composition is applied to provide a dry film thickness of between about 0.1–10 mils and said composition contains between about 5–50 percent of hydroxyl-containing resin selected from the group consisting of epoxy resin, polyamide resin combined with epoxy resin, epoxy esters, acrylic resin and nitrocellulose resin.

5. A coated metal substrate protected with a coating composite, wherein a portion of said coating composite comprises an undercoating and a topcoating each containing particulate material and each established from heat curable compositions, with the undercoating also containing, in liquid medium, a hexavalent-chromium-providing substance which is susceptible to valency reduction to a lower valence state during curing of applied composition, said chromium being at least partially present in said composition in the hexavalent higher valency state, said undercoating composition further containing reducing agent for said chromium and having pulverulent metal as said particulate material and with the undercoating being first established in said composite in non water-resistant condition and then dried at a temperature and for a period of time sufficient to vaporize volatile substituents from applied composition but insufficient to orient the undercoating towards reduction of said chromium in said higher valency state, and with said topcoating being applied on the dry undercoating, said topcoating comprising hydroxyl-containing resin, particulate, electrically conductive pigment, and less than about 5%, basis total topcoat composition weight, of isocyanate adduct capable of unblocking at a temperature above about 350° F., and wherein the curing after topcoat application is heating at a temperature above 350° F. and for a period of time sufficient to: (a) orient at least a portion of the undercoating hexavalent chromium towards reduction; commensurate with, (b) unblocking the isocyanate adduct and providing cross-linking reaction of resulting isocyanate with topcoat resin.

6. The coated substrate of claim 5 characterized by having said undercoating as the first coating on the surface of said substrate.

* * * * *